(12) United States Patent
Krapf et al.

(10) Patent No.: US 8,026,711 B2
(45) Date of Patent: Sep. 27, 2011

(54) MEASURING DEVICE AND METHOD FOR LOCATING OBJECTS ENCLOSED IN A MEDIUM, USING HIGH-FREQUENCY ELECTROMAGNETIC SIGNALS

(75) Inventors: Reiner Krapf, Reutlingen (DE); Heiko Braun, Stuttgart (DE); Michael Mahler, Leinfelden-Echterdingen (DE); Christoph Wieland, Stuttgart-Vaihingen (DE); Ulli Hoffmann, Niefern-Oeschelbronn (DE)

(73) Assignee: Robert Bosch GmbH, Stuttgart (DE)

( * ) Notice: Subject to any disclaimer, the term of this patent is extended or adjusted under 35 U.S.C. 154(b) by 778 days.

(21) Appl. No.: 12/064,050

(22) PCT Filed: Oct. 20, 2006

(86) PCT No.: PCT/EP2006/067636
§ 371 (c)(1),
(2), (4) Date: Feb. 18, 2008

(87) PCT Pub. No.: WO2007/051721
PCT Pub. Date: May 10, 2007

(65) Prior Publication Data
US 2008/0231525 A1 Sep. 25, 2008

(30) Foreign Application Priority Data
Oct. 31, 2005 (DE) .......................... 10 2005 052 367

(51) Int. Cl.
*G01R 19/00* (2006.01)
*G01V 3/08* (2006.01)
(52) U.S. Cl. ......................................... 324/67; 324/326

(58) Field of Classification Search .................... 324/67, 324/228, 326, 329, 332, 334, 344–345, 354, 324/357
See application file for complete search history.

(56) References Cited

U.S. PATENT DOCUMENTS 4,728,897 A * 3/1988 Gunton ........................ 324/329
6,657,577 B1 * 12/2003 Gregersen et al. .............. 342/22

FOREIGN PATENT DOCUMENTS

| DE | 101 04 863 | 8/2001 |
|----|------------|--------|
| EP | 0 179 601 | 4/1986 |
| JP | 61-090070 | 5/1986 |
| JP | 63-304188 | 12/1988 |
| JP | 01-070403 | 5/1989 |
| WO | 99/01781 | 1/1999 |
| WO | 02/086542 | 10/2002 |
| WO | 2005/081015 | 9/2005 |

* cited by examiner

*Primary Examiner* — Bot Ledynh
(74) *Attorney, Agent, or Firm* — Michael J. Striker

(57) ABSTRACT

The invention relates to a measuring device, in particular a hand-held measuring device for locating objects enclosed in a medium, using high-frequency electromagnetic signals. Said device comprises a housing (82) and at least one high-frequency sensor, which is located in the housing and has a first antenna assembly (10) containing at least one first antenna element (12), the latter preferably emitting and/or receiving signals on a first polarization plane. According to the invention, the antenna assembly (10) has at least one additional antenna element (14), whose polarization plane is rotated in relation to the polarization plane of the first antenna element (12). The invention also relates to a method for locating objects enclosed in a medium, using high-frequency electromagnetic signals, in particular a method for operating a handheld locating device comprising a plurality of antenna elements (12, 14; 11, 13), in which the measuring signal can be transmitted and/or received on different polarization planes.

14 Claims, 4 Drawing Sheets

MEASURING DEVICE AND METHOD FOR LOCATING OBJECTS ENCLOSED IN A MEDIUM, USING HIGH-FREQUENCY ELECTROMAGNETIC SIGNALS

BACKGROUND OF THE INVENTION

The present invention relates to a measuring device and a method for locating objects enclosed in a medium using high-frequency electromagnetic signals in a frequency range between 1 and 5 GHz.

As a recent development, high-frequency electromagnetic signals are used in addition to inductive sensors—which have been known for a long time—to locate objects enclosed in a medium. Measuring devices of this type include, e.g., antennas for radiating high-frequency radar signals and microwaves.

Antennas for devices that are designed to detect objects such as lines or pipes in walls are generally optimized for transmitting and/or receiving high-frequency (HF) radar signals. An antenna of this type is known, e.g., from DE 10104863 A1.

The antenna described in DE 10104863 A1 is a single-pieced, planar antenna, which is fixed in position with high mechanical stability on a printed circuit board and generates a relatively symmetrical radiation pattern with largely reduced minor lobes and/or sidelobes. The known antenna is composed of an electrically conductive plate, which includes two angled lateral sections on diametrically opposite edges, the angled lateral sections serving as conducting arms for coupling the antenna to a power supply network.

Locating devices with an antenna may be used in particularly diverse manners, since they are not limited to magnetic materials or the presence of a power supply network. Instead, they register a change in the dielectric constants of the material to be investigated, thereby making it possible to detect, e.g., plastic pipes, air inclusions, and cavities during a measurement.

Devices of this type have a disadvantage, however, namely that they are influenced by the structure of the wall, ceiling or floor, i.e., of the material surrounding the enclosed object. This influence may be relatively great, in some cases even greater than the influence of the enclosed object itself. With radar devices, it is therefore difficult to distinguish between wall structures and inhomogeneities of objects.

SUMMARY OF THE INVENTION

The inventive measuring device for locating objects enclosed in a medium, which may be designed, in particular, as a hand-held measuring device, has the advantage over known measuring devices—that are designed to locate objects using high-frequency electromagnetic signals—that the high-frequency sensor of the measuring device includes at least two antenna elements. The polarization planes of the electromagnetic waves emitted from or received by these antennae are rotated relative to each other.

It is therefore provided to advantageously use a multiple-antenna system, with which a plurality of antenna are located such that the transmission and/or reception using these antenna elements takes place on different polarization planes that are rotated relative to each other in particular. As a result, the measurement signal from a sensor of this type interacts with different levels of intensity with anisotropic, that is, e.g., longitudinal objects.

To this end, e.g., the antenna elements themselves, and/or the symmetry planes of the antenna elements may be rotated relative to each other. This is particularly advantageous, since the antenna geometry and/or symmetry also influences the polarization plane of the transmitted wave. As an alternative, the transmission plane and, therefore, the polarization plane in particular, may be varied via a relative phase shift of two HF signals that are provided to two antenna elements. The reception plane of the individual antennas is always the same.

A high-frequency sensor with a plurality of antenna elements—in the case of which the polarization planes of the waves transmitted from or received by the antenna elements are rotated relative to each other—has the advantage that they measure not only in a single plane, e.g., horizontally, but they may also pick up a measurement signal in several planes. When a stationary measurement is performed, an advantageous result is that an object enclosed in a medium may be located more easily, e.g., by calculating the difference between measurement signals from the different measuring channels. With a single antenna element that transmits a measurement signal in only one plane, the sensor (or, as an alternative, the object itself) must be moved, since it is only possible to detect differences in the dielectric constants using measuring devices of this type. If an object is positioned, e.g., horizontally in a wall, a horizontally polarized measurement signal finds many stronger, returned signals and/or amplitudes than would be detected with a vertically polarized measurement signal, since the latter practically measures only the reflections from the wall and/or the wall structure. A high-frequency sensor of this type with at least two polarization planes—which are rotated relative to each other—of two antenna elements and/or at least two antenna elements, the transmission and reception planes of which are rotated relative to each other, therefore need not be moved, in principle.

With movable sensors as well, a high-frequency system with an inventive multiple-antenna system advantageously makes it possible to factor out the wall structure from the measurement signal. With a dual-antenna system, e.g., with which the antennas are oriented orthogonally to each other, and with which the measurement signals are transmitted with polarization planes oriented at right angles to each other, every signal that is detected by both antennas, i.e., that appears in both measuring channels of the high-frequency sensor, is a component of the wall structure. If the measurement signals of the two antenna elements differ, the detected object is located in a preferred direction of one of the polarization planes ("anisotropy of the signal").

With layered structures, which exist, e.g., in a floor with integrated floor heating, a signal is also generated at every layer (tiles, floor pavement, polystyrene foam, pipes, concrete), since the transmitted measurement signal is reflected based on the particular change in the dielectric constant of the material. With a system of this type as well, the background effect may be eliminated by calculating the difference between the measurement signals, thereby allowing the pipes to be located more effectively and easily.

When a measuring device with only one antenna element is moved parallel to an object, this device is unable to locate the object, since there is no change in dielectric constant to be detected. With a measuring device that includes a plurality of antennas that are rotated relative to each other and/or a plurality of polarization planes—that are rotated relative to each other—of HF measurement signals transmitted by the antennas, a signal difference between the measuring channels assigned to the antenna elements is continually obtained, thereby advantageously making it easier to locate the object.

In addition, the sensitivity of a high-frequency sensor may be adjusted in the best manner possible by operating the available antenna elements in a differentiated manner. The resultant measurement signal hardly increases at all. With a measuring device with only one antenna element, there is the problem of overdriving due to wall reflections and the like, which makes it very difficult to evaluate a signal and to locate the enclosed object. Calculating the difference between the measurement signals—which is possible only with a multiple antenna system and, in particular, a system with polarization planes rotated relative to each other—therefore advantageously increases the dynamics of location measurement.

According to a preferred embodiment of the inventive measuring device, the measuring device includes a plurality n of antenna elements, the polarization planes of which are rotated relative to each other around an angle α. It is particularly advantageous to choose an angle $$\alpha = \frac{180°}{n},$$

so that the transmission or reception takes place in different polarization planes (vertical, horizontal, 30°, and the like), and so that the interaction of the measurement signal with anisotropic, i.e., longitudinal objects differs in intensity.

According to a preferred embodiment, each antenna element is composed of at least two, e.g., triangular, electrically conductive antenna sections, which are positioned symmetric to a measuring point and are diametrically opposed to each other. In particular, these antenna sections may also be separated from each other, i.e., the antenna element may therefore be two-pieced in design. Advantageously, adjacent antenna sections are largely decoupled from each other.

As a result, when these antenna sections are energized, electromagnetic fields are generated and travel outward, thereby creating an antenna. The geometry of the inventive design is selected such that an outwardly-traveling, continuous field is formed in the transverse and longitudinal region in the space above the antenna element without any minor lobes, and it is transmitted in a polarization plane.

Advantageously, the inventive measuring device includes switching means or signal-dividing means that make it possible to divide a send signal—which has been generated once—to the individual antenna elements. When two measurement and/or polarization directions are used, i.e., when two identical antenna elements are used that are rotated relative to each other, and which are advantageously oriented orthogonally to each other in particular, it is necessary, for example, to divide the send signal between two measuring channels in order to control the two antenna elements. To reduce the effort required to generate two signals, a generated signal may be subsequently divided. When it is divided in two directions, the send signal may be divided in the power required. In the standard case, the outputs are advantageously divided as a ratio of input power of the send signal to the number of divisions. Another type of division is also possible.

According to a preferred embodiment, the antenna elements of an antenna assembly are controlled in an in-phase manner. It is also possible, however, to control the antenna elements with a defined phase difference of, e.g., 90° or 180°.

In a further preferred refinement of the inventive measuring device, this device includes a second antenna assembly, which is also provided with a plurality m of antenna elements. In this case as well, the polarization planes of the HF signals transmitted from or received by these antenna elements are rotated relative to each other. This is possible, in particular, due to the fact that the antenna elements themselves are rotated relative to each other, and/or the transmission planes of these antenna elements are rotated relative to each other.

A measuring and/or locating device with which m=n is fulfilled may be realized in a particularly advantageous manner. With a measuring device of this type, which includes two antenna assemblies, each of which includes the same number of antenna elements, a single high-frequency circuitry part of the measuring device may control both antenna assemblies by directing the signal from this HF-circuitry part to either of the antenna assemblies using a changeover switch, or to both antenna assemblies simultaneously using a signal-dividing means.

A high-frequency circuitry part of this type advantageously includes a plurality of measuring channels, with the number of measuring channels being equal to the number of antenna elements of one antenna assembly.

In an advantageous embodiment of the inventive measuring device, it includes a position-detection system that makes it possible to assign the measurement signals of the measuring device to a position of the measuring device. In this manner, it is possible, for example, to depict results measured by the inventive measuring device, e.g., graphically in an output unit such that exact information may be obtained regarding the position of a located object, since the position-detection device connected with the measuring device locates the object and determines its position.

A particularly advantageous embodiment of the inventive measuring device results when additional sensors are integrated in or on the housing of the measuring device. For example, an additional infrared sensor or a capacitive sensor, an inductive sensor, or a mains voltage sensor may be integrated in or on the measuring device. For the detection of heating systems integrated in floors, walls, or ceilings in particular, it is advantageous to use the high-frequency sensor with its antenna elements, as well as, e.g., one or more infrared sensors, since they ensure that heat will be detected, thereby also making it possible, e.g., to detect the flow of a heating system of this type.

By using various sensors in the inventive measuring device, it may be ensured that, e.g., heating tubes may be detected in surroundings that are very difficult to detect. The user is therefore put more at ease, particularly with regard for preventing damage to tubes and pipes of this type.

With the inventive high-frequency method for locating objects enclosed in a medium, a plurality of antenna elements located in a measuring device of this type may advantageously be operated as either a transmitter or receiver of the measurement signal. In particular, means are provided with the inventive method which make it possible to use a different number of antenna elements to transmit and/or receive the measurement signal. Transmission and reception may be carried out in various planes, in particular, since the antenna elements are designed so that measurement signals may be transmitted and received with different polarization planes. For example, the measurement signal may be transmitted simultaneously in all measurement and polarization planes, which are rotated relative to each other. As an alternative, the measurement signal may be transmitted, e.g., in only one direction, e.g., vertically. A method is also possible with which the measurement signal is transmitted in a plurality of polarization directions, although in succession. It makes sense, e.g., to transmit in only one polarization direction and to receive in several, e.g., two directions, since it is possible for, e.g., the wall or an object enclosed in the wall to rotate the phase position of the measurement signal. When one considers that, e.g., metallic objects generate a phase jump of the measurement signal, additional positive information results with regard for the object properties, i.e., a distinction between metal/non-metal using the HF signal. Advantageously, this additional positive information may be evaluated in a signal evaluation of a measuring device. It is therefore entirely reasonable to transmit using fewer antenna elements than are used to receive the measurement signal.

A system is advantageous that makes it possible to transmit in succession and receive in succession, since, in this case, cross-sensitivities are ruled out, as is cross-talk between the transmission and reception elements. A method of this type has the disadvantage, however, that the measuring system requires a great deal of time and high costs, since high-frequency switches must be used in order to switch between the different antenna elements (horizontal, vertical). In contrast, simultaneous transmission and reception saves time, it may be implemented in a more cost-favorable manner, and it requires little data, although the tendency exists for cross-talk between the transmission and reception channels.

Advantageously, a transmission system of this type is made calibration-free by installing a reference path on the transmission side for each measuring channel, e.g., horizontal and vertical for a two-antenna system, the reference path making it possible to switch the measurement signal directly to the antennas, e.g., using a changeover switch, and/or to direct the measurement signal to the reference path. In this manner, it is possible to factor out temperature drifts and other, changeable signal components of the measurement signal, thereby making it possible to prevent erroneous measurements or to ensure that the user need not perform frequent calibrations in short intervals of time. The inventive measuring device and/or the inventive method for locating objects enclosed in a medium using high-frequency electromagnetic signals therefore advantageously makes it possible to improve detection—via a suitable configuration and switching of a plurality of antenna elements—and, in particular, to improve the separation of the measurement signals of enclosed objects from the enclosing medium.

Further advantages of the inventive measuring device and/or the inventive method for locating objects enclosed in a medium result from the description, below, of a few exemplary embodiments.

BRIEF DESCRIPTION OF THE DRAWINGS

Exemplary embodiments of an inventive measuring device and the inventive method are depicted in the drawing, and they are described in greater detail in the subsequent description. The figures in the drawing, their descriptions, and the claims contain numerous features in combination. One skilled in the art will also consider the features individually and combine them to form further reasonable combinations.

DETAILED DESCRIPTION OF THE PREFERRED EMBODIMENTS

Figure 1:
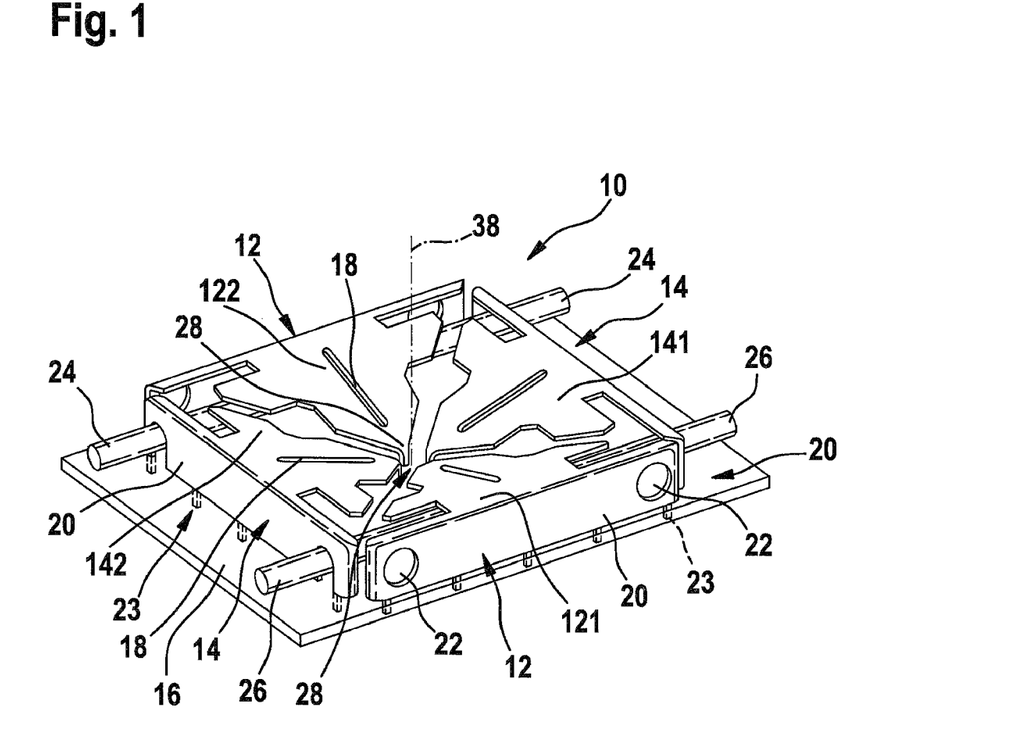
FIG. 1 shows an inventive antenna assembly for a high-frequency sensor of a locating device.

FIG. 1 shows a first exemplary embodiment of an antenna assembly 10 for an inventive measuring device. Antenna assembly 10 according to the exemplary embodiment in FIG. 1 includes two antenna elements 12 and 14, which are located at a 90° angle relative to each other. Antenna assembly 10 is mechanically fixed in position on a support device 16, e.g., a printed circuit board, and is electrically contacted therewith.

Antenna elements 12 and 14 are composed of two separate, essentially triangular antenna sections 121 and 122 (for antenna element 12) and 141 and 142 (for antenna element 14). The antenna sections of an individual antenna are separated from each other and from the antenna sections of the other antenna element. Individual laminations 121, 122, 141, 142 of the antenna assembly in FIG. 1 are soldered in place through base points 23 in support device 16. Once all four antenna sections have been installed, the antenna assembly is complete. To reduce eddy-current effects in the essentially triangular antenna sections, slots or recesses 18 are provided—as shown in FIG. 1—which preferably extend along the mirror or symmetry axis of antenna sections 10. Essentially triangular antenna sections 121, 122, 141 and 142 transition into electrically conductive shielding walls 20, which extend essentially perpendicularly to support device 16, on the outer sides of a square-shaped antenna assembly.

In addition, recesses 22 are provided in shielding walls 20 of antenna assembly 10, and two wheel axles are installed in the transverse direction. Wheel axles 24, 26 and the rolling elements—which are not shown in FIG. 1, for clarity—connected with them are part of a position-detection system of the inventive measuring device, with the aid of which the measuring device may be moved over a surface to be investigated. This position-detection system also makes it possible to determine the exact path, thereby making it possible to also forward the location information for every measurement signal detected to the evaluation unit of the measuring device.

Triangular tips 30 located in the region of central point 28 of the antenna assembly are contacted with HF signal connections—not shown in FIG. 1—of support device 16. Central point 28 of the antenna assembly is therefore also the measuring point of the assembly.

Figure 2:
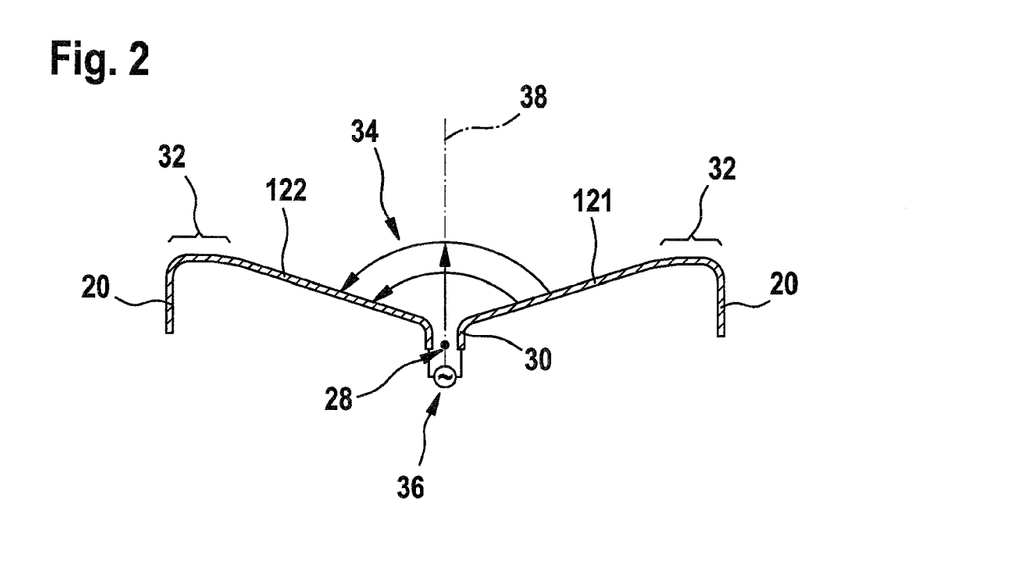
FIG. 2 shows a cross section through the antenna assembly in FIG. 1, in a schematicized depiction.

FIG. 2 shows—for clarification—a schematic cross section through a mirror axis of antenna element 12, which is composed of essentially triangular antenna sections 121 and 122, and shielding walls 20. A transition section 32 is located between shielding walls 20 and antenna sections 121, 122.

Curved arrow 34 in FIG. 2 represents an alternating electromagnetic field, which is supplied with HF signals. The electromagnetic waves propagate along antenna axis 38 in a plane, i.e., the polarization plane, which corresponds to the plane of the drawing in FIG. 2. The wavelengths are in the radar range, with a frequency of preferably between 1 and 5 GHz. The designation "HF signals" or "high-frequency signals" refers to this frequency range.

Two diametrically located HF signal connections 30 may be energized in a differentiated manner, e.g., with HF signals that have been phase-shifted by 180° relative to each other. This results in an operation of the device with two different polarization planes that are preferably offset from each other by approximately 90°. Diametrically opposed connections of the assigned antenna sections are located geometrically close to each other and are preferably oriented parallel with antenna axis 38. Shielding wall 20 of an antenna section is connected—in two dimensions, or at least partially—at its lower end in the region of support device 16 with a system ground—preferably a reference potential.

Electromagnetic fields therefore form between diametrically opposed antenna sections 121 and 122, and 141 and 142, and they travel outward in a manner known per se. The geometry of the antenna assembly is designed such that an outwardly-traveling, continuous field forms in the transverse section and longitudinal region above the antenna assembly. Directly adjacent antenna sections are largely decoupled from each other.

Advantageously, the antenna assembly shown in FIG. 1—which includes two antenna elements 12 and 14, which have been rotated by 90° relative to each other—is controlled such that the supplied and transmitted HF signals are in phase. In addition to this preferred embodiment, with which the two antenna elements function in-phase, it is also possible in principle to operate the two antenna elements, or—if more than two antenna elements are used—to operate them with a phase difference of 90° or, e.g., even 180°.

The method for locating objects using high-frequency electromagnetic signals of the type used in the inventive measuring device will be explained with reference to FIG. 3.

Figure 3:
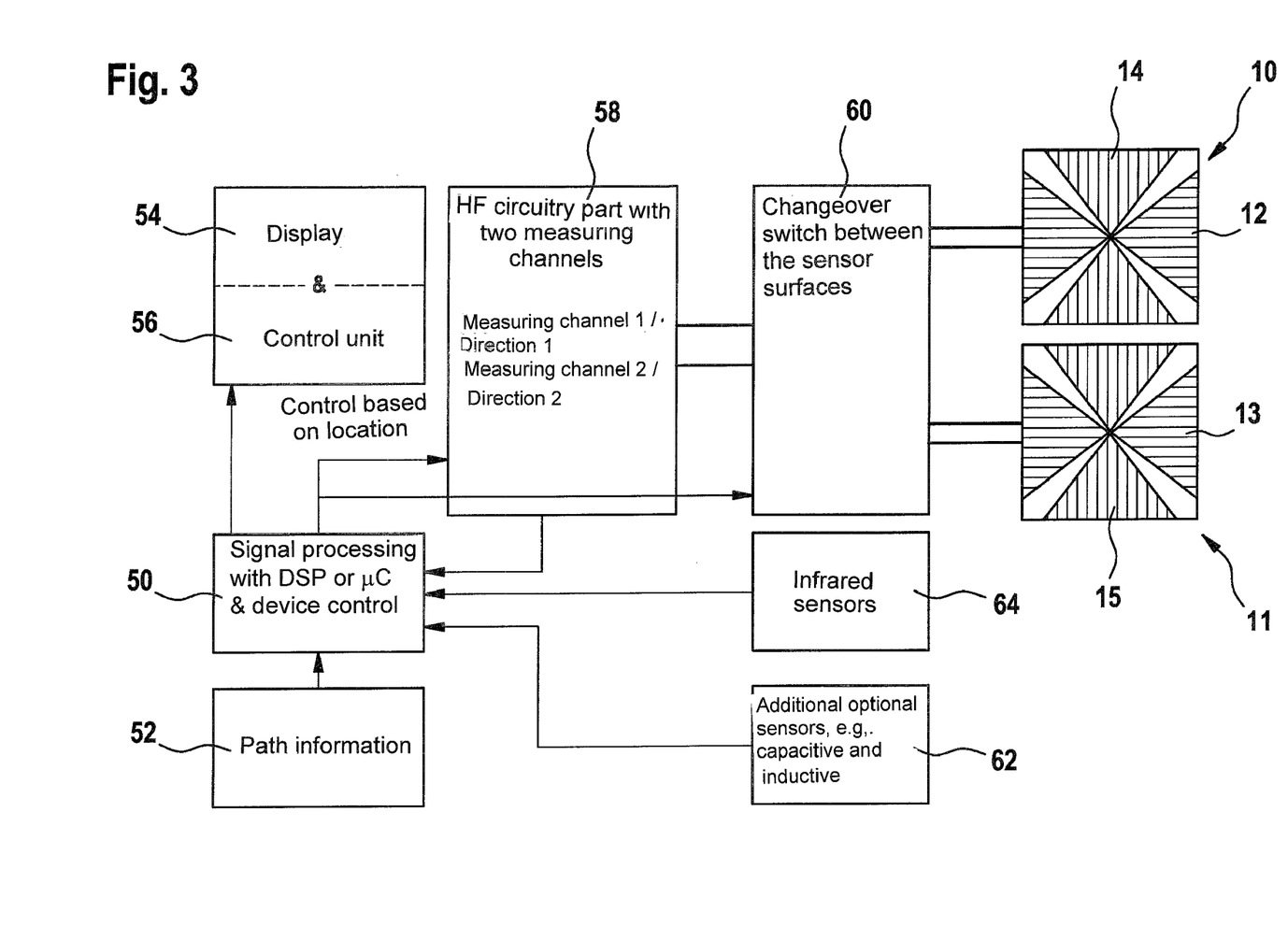
FIG. 3 is a block diagram that illustrates the inventive method.

FIG. 3 shows a schematicized block diagram of the essential components—and their interaction—of an inventive measuring device.

The device includes a central signal processing and device control 50, which may be integrated, e.g., in a DSP or a microcomputer. This device control coordinates and processes the information from position-detection system 52, which allows the position of the measuring device to be determined via wheel axles 24, 26. Device control 50 also controls an output unit of the measuring device, which may be realized, e.g., as a display 54 in the form of a graphical display in the housing of the measuring device. The central signal processing or device control 50 also processes input from a user, which may be transmitted to the device control via a control unit formed on the measuring device. Using control unit 56, a user of the inventive measuring device may start different measuring programs, for example.

In the exemplary embodiment shown in FIG. 3, the inventive measuring device includes two antenna assemblies 10 and 11, which include two antenna elements 12 and 14 (for antenna assembly 10), and 13 and 15 (for antenna assembly 11), which are positioned at a 90° angle relative to each other. The design of antenna assembly 10 and 11 may correspond to the design explained with reference to FIG. 1.

The inventive measuring device and the related inventive method are not limited to the use of one or two antenna assemblies. FIG. 3 therefore serves only to describe the basic principle involved. The inventive method and a related measuring device may be realized, in principle, with any number of antenna assemblies. Nor is the particular antenna assembly limited to the use of only two antenna elements in one antenna assembly. In deviation from the exemplary embodiment shown in FIG. 1 or 3, merely as an example, the inventive measuring device and/or the inventive method may also include antenna assemblies with any number of antenna elements. These antenna elements are rotated around an angle α relative to each other, in particular. Angle α is preferably selected such that, given a number of n antenna elements, angle α between the antenna elements, i.e., between the symmetry axis of these antenna elements, is given by $$\alpha = \frac{180°}{n}.$$

When three antenna elements are used in an antenna assembly, for instance, the antenna elements would be rotated around an angle of 60° relative to each other. The inventive measuring device and the inventive method are not limited to the use of essentially triangular antenna sections. The antenna elements may also be designed, e.g., as one-pieced, e.g., rectangular planar antennas.

An exemplary embodiment with two antenna assemblies, each one including two antenna elements, will be described below in greater detail, as an example. Antenna elements 12 and 14 or 13 and 15 according to the exemplary embodiment shown in FIG. 3 are located such that the radiation extends in different planes (vertical, horizontal). An HF signal therefore interacts with anisotropic, i.e., longitudinal objects, with different levels of intensity. The signal used and which is typically located in a frequency range of 1 to 5 GHz may be a pulsed signal or a FMCW (frequency-modulated continuous wave) signal. A pseudo noise signal may also be used. Basically, any type of radiation of microwaves may be used with the inventive method.

Central device control 50 of the inventive measuring device according to the exemplary embodiment shown in FIG. 3 controls an HF circuitry part 58, which includes several measuring channels in accordance with the number of antenna elements used. In the exemplary embodiment shown in FIG. 3, the HF circuitry part therefore includes two measuring channels for antenna elements 12, 14, and 13, 15. The HF signals generated are transmitted via the measuring channels to the antenna elements, so that—as described in conjunction with FIG. 2—a high-frequency, electromagnetic wave is transmitted by the particular antenna assembly in a plane.

When several antenna assemblies are used, as shown in the exemplary embodiment in FIG. 3, a changeover switch 60 may be provided between HF circuitry part 58 and the antenna assemblies (10, 11 in the exemplary embodiment). HF circuitry part 58 transmits the high-frequency measuring signal to either antenna assembly 10 and 11, or to both simultaneously.

To prevent the expense required to generate two high-frequency signals, only one HF signal may be generated in HF circuitry part 58 or upstream thereof, and is then supplied—with the relevant phase position—to two (or more) measuring channels of particular antenna assembly 10 or 11. When the HF send signal is divided in two directions or between two antenna elements, it may be divided into the power required. In the standard case, the outputs are divided as a ratio of input power to the number of divisions. Another type of division is also possible. The HF signals supplied to the antenna elements may be, e.g., in-phase, or they may be provided with a phase difference. It is possible, e.g., to provide the partial signals that are sent to the antenna elements of an antenna assembly with a phase difference of 90° or 180°.

The following possibilities advantageously result for transmitting and receiving the HF signals when two (or three, four, etc.) antenna elements are used in one antenna assembly:

The HF signal for locating enclosed objects may be transmitted simultaneously in both directions (antenna elements 12 and 14). As an alternative, it is also possible to transmit in both directions in series, i.e., in succession. It is also possible to transmit in only one direction, e.g., vertically, independently of the number of antenna elements in an antenna assembly. As described above, the feed to the antennas may be different when transmitting in both directions. Transmission in both directions, i.e., with both antenna elements, may take place in-phase. It is also possible to provide the emitted HF signals of both antenna elements with a phase difference of 90° or 180°.

In an analogous manner, the HF signal, which has been reflected on a medium or on an object enclosed in the medium, may be received in different configurations of the antenna assembly. For example, the reflected signal may be received in both directions and simultaneously. As an alternative, the reflected signal may be received in both directions, although in succession. It is also possible to use only one antenna element of an antenna assembly for transmission, but to use several antenna elements for reception.

It is therefore entirely reasonable to transmit in only one direction, i.e., with one measuring channel (12 or 14, or 13 or 15), and to receive in both directions (12 and 14, and 13 and 15), since an object to be located and/or the enclosing medium, e.g., a wall, may rotate the phase position of the measurement signal. Metallic objects, for instance, generate a phase jump, thereby making it possible to use different transmission and reception configurations to obtain additional information about object properties, e.g., to distinguish between metal/non-metal, e.g., by performing the signal evaluation with only one reception channel or with both reception channels.

It is advantageous in principle to transmit in succession and to receive in succession, since cross-sensitivities and cross-talk are therefore largely ruled out. A disadvantage of this method, however, is that the system requires a great deal of time and high costs, since HF switches must be used and large quantities of data are generated, which must be transferred and processed. In contrast, simultaneous transmission and reception saves time, it may be implemented in a more cost-favorable manner, and it requires little data, although there is a risk that signal quality will be poorer due to cross-talk between the measuring channels.

A reasonable compromise appears to be to design a system that transmits simultaneously but receives in succession, since this requires signal division only on the transmission side, only one receiver (e.g., a sampler with an AD converter) is required on the reception side, and a switch is not required.

Due to the two measurement locations and the two measurement directions of the high-frequency sensor system, it is possible to determine the position and extension of the object enclosed in the medium, e.g., in a wall. Background may be eliminated directly for every measuring point via the two special directions of the antenna assembly measured, which correspond to the two polarization directions of the measurement signal, thereby making it possible, e.g., to more effectively detect plastic pipes in construction materials. In this manner it is possible to reduce the influence of the structure of the enclosing medium, e.g., a wall, a ceiling, or a floor, and, therefore, to detect objects, e.g., plastic pipes, that generate a weak signal.

Advantageously, the inventive transmission system of this type is kept free from calibration by installing a reference path on the transmission side for each measuring channel (e.g., horizontal and vertical in the exemplary embodiment shown in FIG. 3), the reference path making it possible to switch—e.g., using a changeover switch—the HF signal to a reference, e.g., a defined terminating resistor, or directly to the related antenna element. In this manner, temperature drifts for other, changeable signal components may be factored out via the signal processing. This usually requires that calibration be performed at the factory or by the user, but it prevents erroneous measurements.

In addition to the antenna assemblies described above, the inventive measuring device may also include additional sensors that make it easier to locate objects enclosed in a medium. For example, further inductive or capacitive sensors may be provided, which are represented collectively with reference numeral 62 in the block diagram in FIG. 3. For instance, inductive and/or capacitive sensors may make it easier to simply locate an enclosed object, and to identify the object material. The use of infrared sensors 64 is particularly advantageous, since they make it possible to identify heat sources. In conjunction with the detection of the exact position of heating systems integrated in floors, walls, or ceilings, it is advantageous in particular to equip the inventive measuring device with an additional infrared sensor. By using all of the sensors in the inventive measuring device, it may be ensured that the heating tubes may be detected in surroundings that are very difficult to detect. The user is therefore put more at ease, particularly with regard for preventing damage to the tubes. It is also possible, e.g., by using an infrared sensor system, to determine the heat distribution in the floor, e.g., the direction of flow of the heating or a leak.

Figure 4:
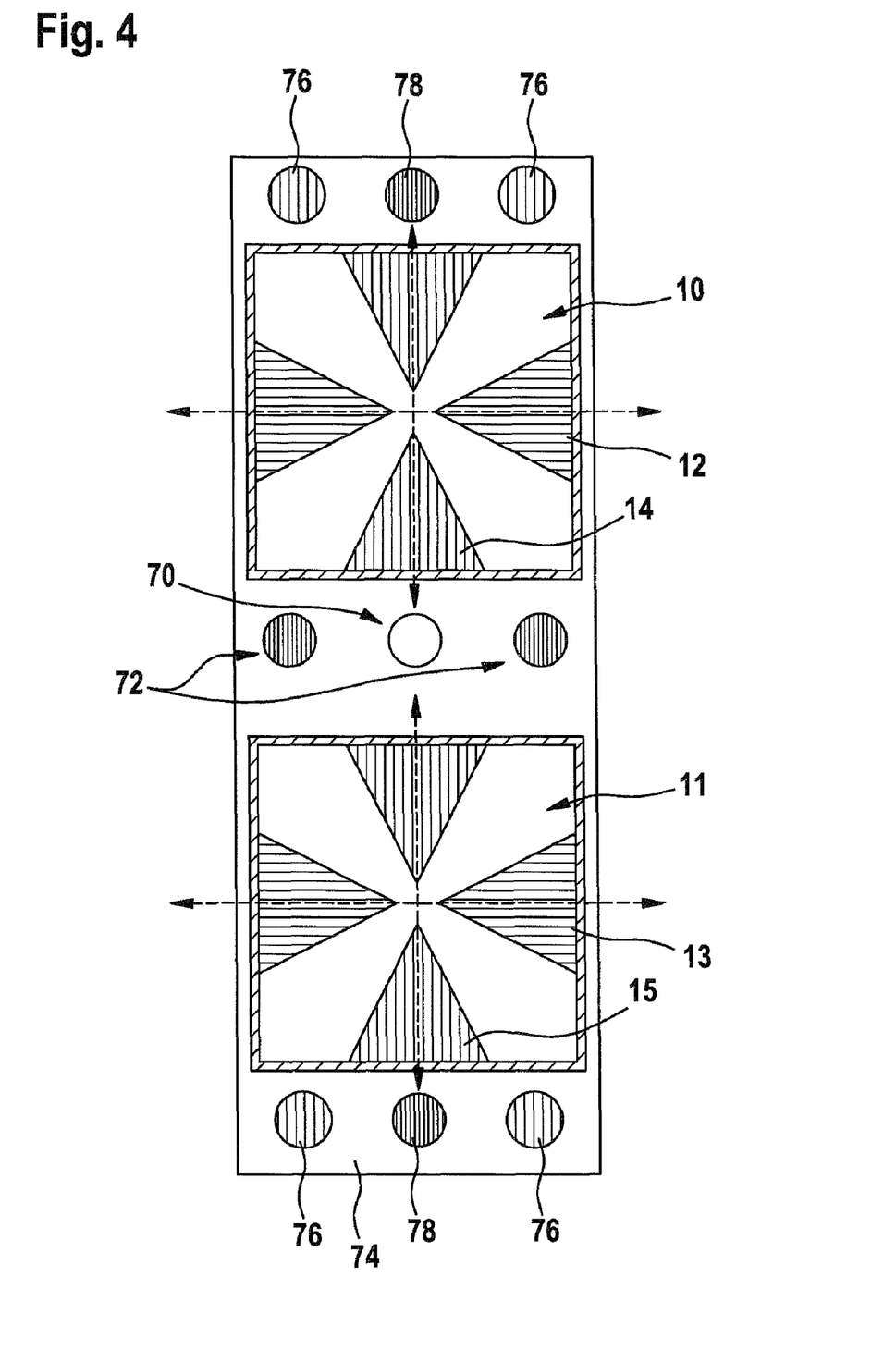
FIG. 4 shows an alternative sensor assembly for an inventive measuring device, in a simplified, schematicized depiction.

FIG. 4 is a schematicized depiction of a possible sensor configuration for an inventive measuring device. The sensor includes two antenna assemblies 10 and 11, each with two antenna elements 12 and 14, and 13 and 15. An infrared sensor system is located between the two antenna assemblies 10 and 11, with which the heat of an object may be determined, e.g., using a first infrared sensor 70. It is also possible to determine the heat distribution using an additional, specially separated infrared sensor system 72, which includes, e.g., two additional infrared sensors, which may also be evaluated in a differential manner. In addition to HF sensor system 10 and 11, and infrared sensor system 70 and 72, sensor 74 according to the exemplary embodiment shown in FIG. 4 also includes a coil assembly 76 of an inductive sensor system, and a capacitive sensor 78.

The inventive measuring device and the inventive method for locating objects enclosed in a medium using high-frequency electromagnetic signals therefore makes it possible to position the sensors and the shielding thereof in an advantageous manner, and, in particular, to better separate the signals of the wall structure from the signals of the enclosed object. By using several antenna elements that have been rotated relative to each other, it is therefore possible, in particular, to better detect the position and extension of objects.

Figure 5:
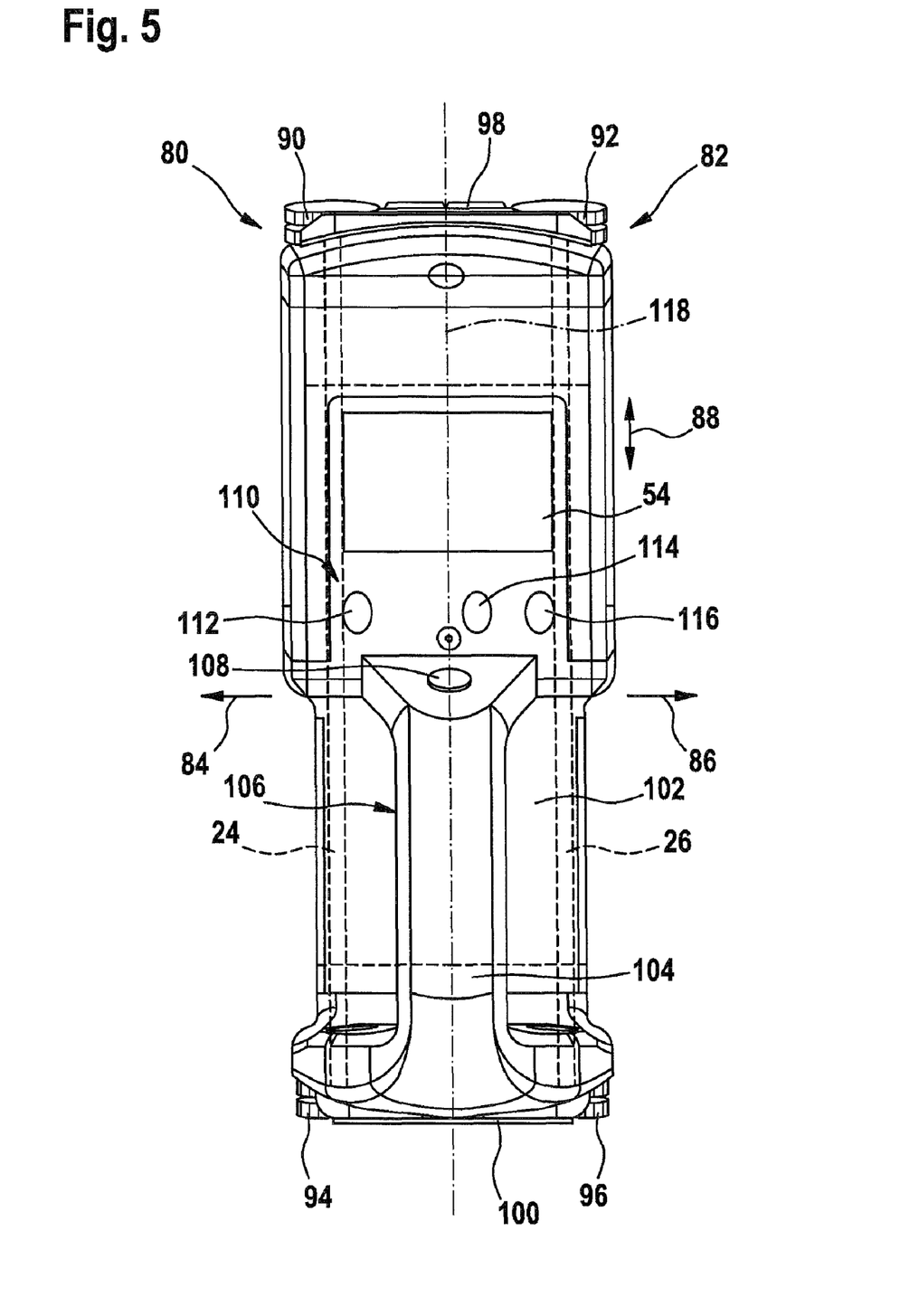
FIG. 5 shows an inventive measuring device as a perspective overview.

FIG. 5 shows an overview of an exemplary embodiment of an inventive measuring device. FIG. 5 shows a hand-held locating device 80 for detecting objects enclosed in a medium using a plurality of sensors.

Housing 82 of locating device 80 is movable in two preferred, opposite directions of motion 84 and 86, which extend perpendicularly to a longitudinal extension 88 of housing 82 of the measuring device. Locating device 80 includes four rolling elements 90, 92, 94 and 96, which are designed as wheels and are located in longitudinal extension 88 of the device on diametrically opposed end faces 98 and 100, in the transverse extension of the device in its outer region. Rolling elements 90 and 94, and 92 and 96, which are diametrically opposed in longitudinal extension 88, are non-rotatably connected with each other via rigid axles 24 and 26 (see FIG. 1). Rigid axles 24 are guided by the antenna assembly in such a manner that it serves—together with its holder—as an axial guide for movable device 80.

To record motion parameters, locating device 80 includes a sensor unit with two sensors, in particular, with which the motion parameters may be detected. To this end, segmented wheels are mounted on axles 24 and 26 in a not-shown manner; the segmented wheels move in fork light barriers, thereby enabling the direction of motion of the device to be detected.

Housing 82 of measuring device 80 includes a holding device 106 on its top side 102 that is formed by a C-shaped handle 104. Holding device 106 extends in longitudinal extension 88 of housing 82. Using holding device 106 and wheels 90, 92, 94 and 96, the measuring device may be guided over the surface of a medium to be investigated, e.g., a wall, a floor, or a ceiling.

On its end facing a graphical display 54, holding device 106 includes a first operating element 108, with which a measuring procedure for locating an embedded object may be started or ended. A keypad 110 is located between holding device 106 and the screen of device, which is designed as graphical display 54. Keypad 110 includes various measurement buttons 112, 114, 116, with which, e.g., different sensors of the multiple sensor system of the measuring device may be switched on or off.

Inventive antenna assembly 10, and 10 and 11, is located in top part 118 of the measuring device facing away from holding element 106, and it is indicated schematically using a dashed line in FIG. 5. Antenna elements 12 and 14, and 12, 13, 14 and 15 of the high-frequency sensor are oriented toward the underside of housing 82, which is hidden from view in FIG. 5.

The inventive measuring device, in particular a hand-held locating device for detecting objects embedded in a medium, includes a multiple sensor system, in particular a high-frequency sensor system, e.g., one or more radar antennas in a frequency range between approximately 1 and 5 GHz. The inventive measuring device also includes an inductive sensor for locating metallic objects. The high-frequency antennas and the coil assemblies of an inductive sensor are positioned relative to each other by a mechanical support device and, overall, as a multi-sensor element, in the housing of the measuring device. The mechanical support device may be installed directly on a support PCB of the measuring device, which includes further electronic control elements for operating the measuring device. Further sensors, such as capacitive sensors, mains voltage detectors, which may detect the alternating voltage field of a mains voltage line in a capacitive and passive manner, i.e., without generating an electrical field, and one or more capacitive, high-frequency detectors may be located in recesses of a mechanical support device or an assigned support PCB 16 such that each sensor in this multiple sensor system has the same measuring point; this results in a more accurate result about the object that was detected.

What is claimed is:

1. A hand-held measuring device for locating objects enclosed in a medium using high-frequency electromagnetic signals in the range of 1 to 5 GHz, with a housing (82) and at least one high-frequency sensor, which is located in this housing (82) and includes a first antenna assembly (10) with at least one first antenna element (12) that emits and/or receives signals in a first polarization plane, wherein the antenna assembly (10) has at least one additional antenna element (14), the polarization plane of which is rotated relative to the polarization plane of the first antenna element (12), the measuring device further having a position-detection system (24, 26, 52) that' makes possible an exact path.

2. The measuring device as recited in claim 1, wherein the measuring device (80) includes a first plurality n of antenna elements (12, 14), the polarization planes of which are rotated relative to each other.

3. The measuring device as recited in claim 2, wherein the polarization planes are rotated relative to each other around an angle α.

4. The measuring device as recited in claim 3, wherein $$\alpha = \frac{180°}{n}$$

applies.

5. The measuring device as recited in claim 1, wherein each antenna element (12, 14) is composed of at least two electrically conductive antenna sections (121, 122, 141, 142), which are positioned symmetrically around a measuring point (28) and are diametrically opposed to each other.

6. The measuring device as recited in claim 1, wherein a switching element (58) or a signal-dividing element (58) is provided that makes it possible to divide a send signal among several antenna elements (12, 14).

7. The measuring device as recited in claim 1, wherein a switching element (58) or a signal-dividing element (58) is provided that makes it possible to control the antenna elements (12, 14) of an antenna assembly (10) in an in-phase manner.

8. The measuring device as recited in claim 1, wherein a switching element (58) or a signal-dividing element (58) is provided that makes it possible to control the antenna elements (12, 14, 14) of an antenna assembly (10) with any defined phase difference.

9. The measuring device as recited in claim 1, wherein a second antenna assembly (15) with a second plurality m of antenna elements (13, 15) is located in the housing (82) of the device (80).

10. The measuring device as recited in claim 2, wherein m=n applies.

11. The measuring device as recited in claim 9, wherein a high-frequency circuitry part (58) is provided that controls both antenna assemblies (10, 11) by directing the signal from this HF-circuitry part (58) to either of the antenna assemblies (10, 11) using a changeover switch (60), or to both antenna assemblies (10, 11) simultaneously using a signal-dividing means.

12. The measuring device as recited in claim 7, wherein the high-frequency circuitry part (58) includes a plurality of measuring channels; the number of measuring channels is equal to the number of antenna elements (12, 14; 11, 13) of an antenna assembly (10, 11).

13. The housing as recited in claim 1, wherein at least one additional infrared sensor (64, 70, 72) is located on or in the housing (82) of the measuring device (80).

14. The measuring device as recited in claim 1, wherein the measuring device includes switching means that make it possible to direct the HF signal to a reference network.

* * * * *